US012434495B1

(12) United States Patent
Zhang et al.

(10) Patent No.: US 12,434,495 B1
(45) Date of Patent: Oct. 7, 2025

(54) CUTTING MECHANISM

(71) Applicant: PRIMAX ELECTRONICS LTD., Taipei (TW)

(72) Inventors: Bing-Huai Zhang, Taipei (TW); Wei-Hsun Hsu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/638,715

(22) Filed: Apr. 18, 2024

(30) Foreign Application Priority Data

Mar. 20, 2024 (CN) ......................... 202410323215.0

(51) Int. Cl.
*B41J 11/70* (2006.01)
*B41J 3/407* (2006.01)

(52) U.S. Cl.
CPC ........... *B41J 11/703* (2013.01); *B41J 3/4075* (2013.01)

(58) Field of Classification Search
CPC ............ B65H 35/0086; B65H 35/0026; B65H 2402/70; B65H 35/06; B26D 7/088; Y10S 83/922; Y10S 83/949; Y10T 83/242; Y10T 83/896; B41J 11/703; B41J 3/4075
See application file for complete search history.

(56) References Cited

U.S. PATENT DOCUMENTS 6,732,626 B2 * 5/2004 Hong ................. B65H 35/0026 225/95
9,776,823 B2 * 10/2017 Yamada ............. B65H 35/0026
2019/0330006 A1 * 10/2019 Iwamoto .............. B65H 35/002

FOREIGN PATENT DOCUMENTS

CN 210211741 U * 3/2020
CN 117260858 A * 12/2023 ............. B26D 7/088
CN 118494035 A * 8/2024 ........... B26D 7/2614
JP 2010005734 A * 1/2010 ............. B26D 1/085
JP 2017148938 A * 8/2017
JP 2023007176 A * 1/2023

* cited by examiner

*Primary Examiner* — Christle I Marshall
(74) *Attorney, Agent, or Firm* — WPAT, PC

(57) ABSTRACT

A cutting mechanism for cutting a label from a printing device is provided. The cutting mechanism includes a casing, a knife assembly and a lubricating assembly. The knife assembly is disposed within the casing. The casing includes a base and a movable knife. The movable knife is movable upwardly or downwardly relative to the base to cut the label. The movable knife is exposed through an opening of the casing. The lubricating assembly includes a support frame and at least one oil-absorbing element. The lubricating assembly is pivotally coupled to the casing through the support frame. Consequently, the at least one oil-absorbing element is inserted into the opening and contacted with the movable knife of the knife assembly. While the movable knife is moved upwardly or downwardly, a lubricating oil in the at least one oil-absorbing element lubricates the movable knife.

11 Claims, 7 Drawing Sheets

CUTTING MECHANISM

FIELD OF THE INVENTION

The present invention relates to a cutting mechanism, and more particularly to a cutting mechanism for cutting labels from a printing device.

BACKGROUND OF THE INVENTION

With the progress of societies and the rapid development of industries, labels are widely used in supermarket retails, clothing tags, logistics labels, mass transportation tickets, drug labeling technologies, barcode printing technologies, or the like. However, most of the existing label printers on the market are only suitable for printing labels with liners. When using the label, the user needs to remove the liner from the label first, and then paste the label on the target object. Although this type of label with the liner can meet most of the use needs, the liner is discarded after use. The discarded liner may result in the waste of resources and increase the cost. In addition, the use of the label with the liner is complicated to the user.

For solving the drawbacks of the conventional technologies, the uses of linerless labels as the printing media have gradually become the trend. The linerless labels make the label printing process more friendly and environmentally friendly. In addition, since there are no liners, more labels can be printed on each paper roll. This approach not only reduces waste but also contributes to environmental sustainability. In addition, linerless labels require less raw materials and have less impact on the environment. Furthermore, the benefits of removing the liners include the reduced storage space requirements, the reduced transportation cost, the warehousing cost and the raw material management cost.

Nowadays, the applications of the linerless labels are gradually increased. During the process of using the linerless label, the adhesive on the linerless label may easily stick to a cutter, a pressing board or other components. If the adhesive on the linerless label sticks to the cutter, the service life of the cutter will be affected. In accordance with a current solution on the market, the cutter is oiled to reduce the adhesion of the adhesive. However, the cutter is usually oiled once. That is, the cutter is oiled when it was made, but the cutter is not oiled during use. Even if the cutter is oiled during use, the oiling process is manually done and very inconvenient to use. Regardless of whether the cutter is oiled once or the oiling process is manually done, the label adhesive and the label debris will stick to the surface of the cutter after the oil stains are exhausted. Due to the label adhesive and the label debris, the cutter becomes dull and easily damaged. Consequently, the service life of the cutter is reduced.

Therefore, there is a need of providing an improved cutting mechanism in order to overcome the drawbacks of the conventional technologies.

SUMMARY OF THE INVENTION

An object of the present invention provides a cutting mechanism. The structure of the cutting mechanism is specially designed to prevent residual adhesives or foreign matters from sticking on the knife assembly. Consequently, the service life of the knife assembly will be extended.

The other objects and advantages of the present invention will be understood from the disclosed technical features.

In accordance with an aspect of the present invention, a cutting mechanism for cutting a label from a printing device is provided. The cutting mechanism includes a casing, a knife assembly and a lubricating assembly. The casing includes an opening. The knife assembly is disposed within the casing. The casing includes a base and a movable knife. The movable knife is installed on the base. The movable knife is movable upwardly or downwardly relative to the base to cut the label. The movable knife is exposed through the opening. The lubricating assembly includes a support frame and at least one oil-absorbing element. The at least one oil-absorbing element is installed on the support frame. A lubricating oil is absorbed in the at least one oil-absorbing element. The lubricating assembly is pivotally coupled to the casing through the support frame. Consequently, the at least one oil-absorbing element is inserted into the opening and contacted with the movable knife of the knife assembly. While the movable knife is moved upwardly or downwardly, the lubricating oil in the at least one oil-absorbing element lubricates the movable knife.

In an embodiment, the support frame of the lubricating assembly is pivotally moved in a region between a first position and a second position of the casing. When the support frame is in the first position, the at least one oil-absorbing element is inserted into the opening and contacted with the movable knife. When the support frame is pivotally moved from the first position to the second position, the at least one oil-absorbing element is correspondingly moved with the support frame and detached from the movable knife.

In an embodiment, the lubricating assembly is pivotally coupled to the casing in a detachable manner.

In an embodiment, the support frame of the lubricating assembly includes at least one receiving part, and the at least one oil-absorbing element are received within the at least one receiving part.

In an embodiment, the at least one oil-absorbing element is made of felt or porous foaming material.

In an embodiment, the lubricating oil absorbed by the oil-absorbing element is between 5 grams and 7 grams.

In an embodiment, the cutting mechanism further includes an anti-stick layer, and a surface of the support frame of the lubricating assembly is covered by the anti-stick layer.

In an embodiment, the casing further includes an output port and a guide plate. The output port and the opening are aligned with each other. The guide plate is extended externally from the opening and located over the lubricating assembly. A region between the guide plate and the lubricating assembly is defined as an inlet port corresponding to the output port. A space in the base of the knife assembly and between the inlet port and the output port is defined as a channel.

In an embodiment, the lubricating assembly further includes a roller assembly. The roller assembly is installed on the support frame and located over the at least one oil-absorbing element. The roller assembly and the guide plate of the casing are aligned with each other. The inlet port is defined by the roller assembly and the guide plate of the casing collaboratively.

In an embodiment, the cutting mechanism further includes an anti-stick layer, and the roller assembly includes plural rollers. The surfaces of the plural rollers are covered by the anti-stick layer.

In an embodiment, the knife assembly further includes a fixed knife, and the fixed knife is installed on the base and arranged above the movable knife. While the movable knife is moved upwardly, the movable knife and the fixed knife are engaged with each other to cut the label.

In an embodiment, the knife assembly further includes a hollow region. The hollow region is formed in the base and aligned with the opening of the casing. The movable knife is exposed through the hollow region. The at least one oil-absorbing element of the lubricating assembly is inserted into the opening and the hollow region and contacted with the movable knife.

In an embodiment, the label is a linerless label.

From the above descriptions, the present invention provides the cutting mechanism. In the cutting mechanism, the oil-absorbing element containing the lubricating oil is installed on the support frame, which is detachable and pivotally movable. Furthermore, the oil-absorbing element is previously pressed and attached on the movable knife of the knife assembly. When the movable knife of the knife assembly is moved upwardly and downwardly in a reciprocating manner, the movable knife is continuously rubbed against the oil-absorbing element containing the lubricating oil. Since the lubricating oil in the oil-absorbing element lubricates the movable knife continuously, the purpose of continuously lubricating the movable knife can be achieved. In this way, the surface of the movable knife is maintained in the lubricated state and not lubricated by the label adhesive and the label debris. Since the movable knife is kept clean for a long time, the service life of the knife assembly will be extended. The cutting mechanism of the present invention is especially designed to deal with a lot of residual adhesives or foreign matters when the cutting linerless media. Since the surface of the movable knife is maintained in the lubricated state, the surface of the movable knife will not be stained by so many residual adhesives that are generated quickly.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. The direction terms mentioned in the present invention, such as "upper", "lower", "inner", "outer", "side", etc., are only the directions for referring to the attached drawings. Therefore, the directional terms are used to describe and understand the present invention, not to limit the present invention.

Figure 1:
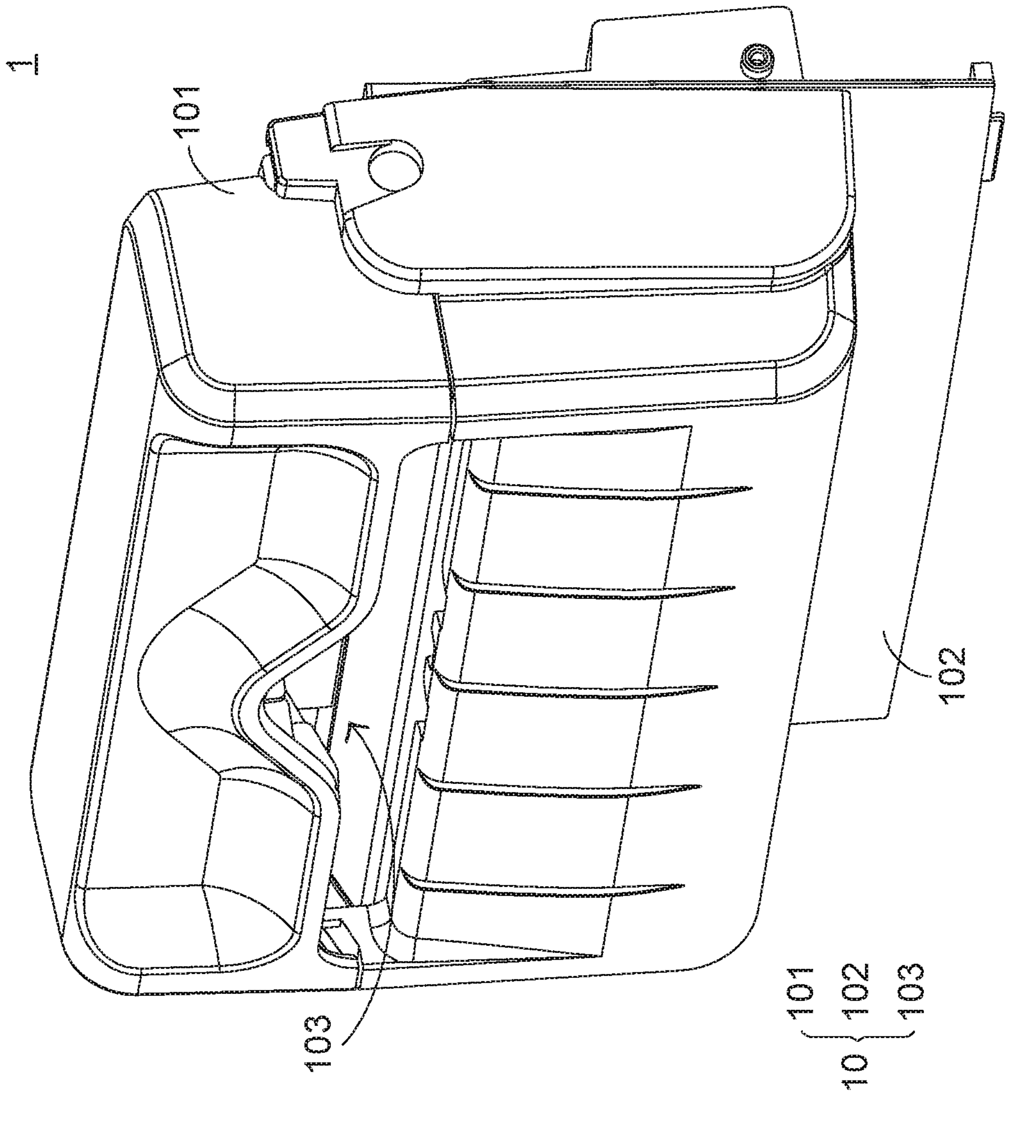
FIG. 1 is a schematic perspective view illustrating the structure of a cutting mechanism according to an embodiment of the present invention.
Figure 2:
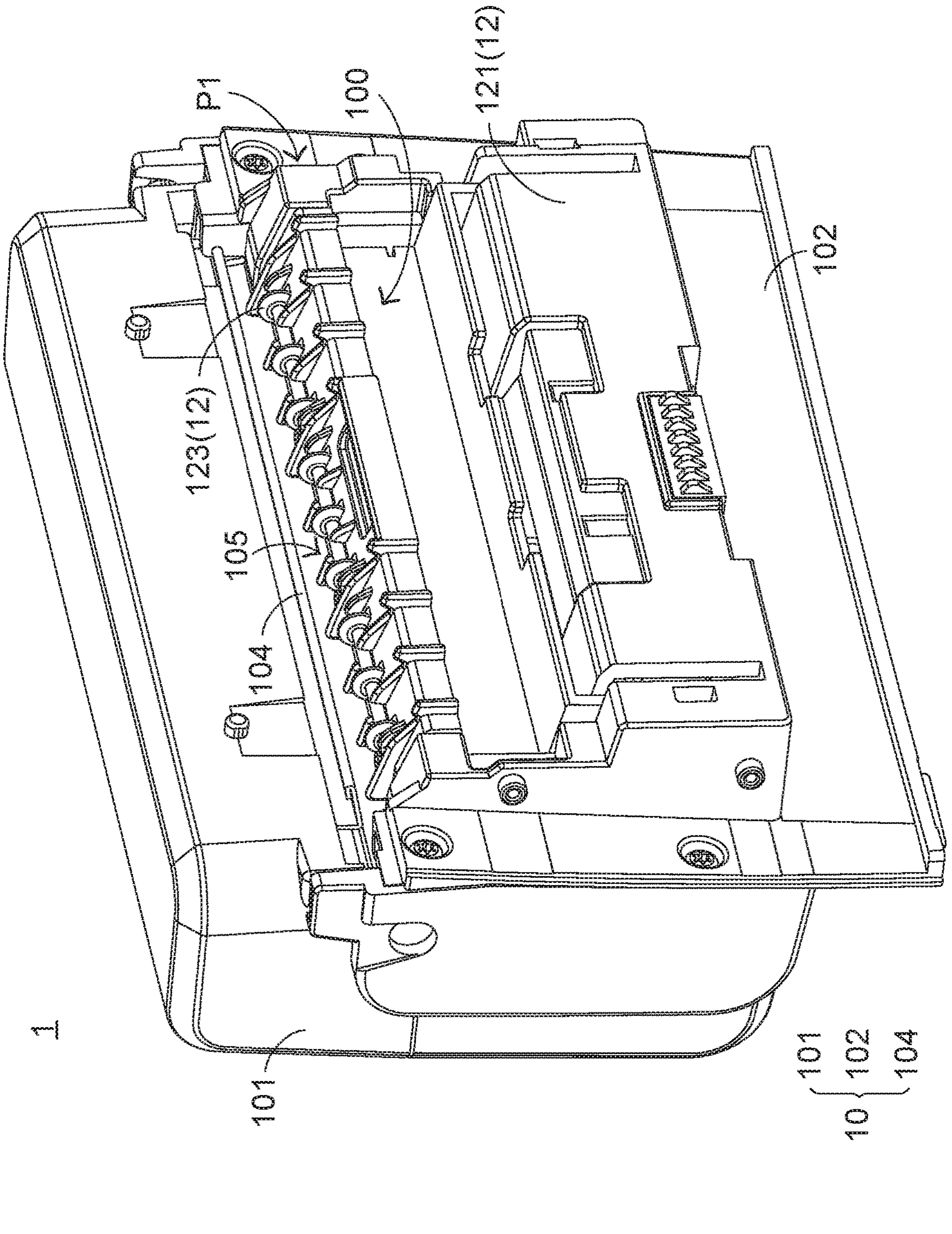
FIG. 2 is a schematic perspective view illustrating the structure of the cutting mechanism shown in FIG. 1 and taken along another viewpoint.
Figure 3:
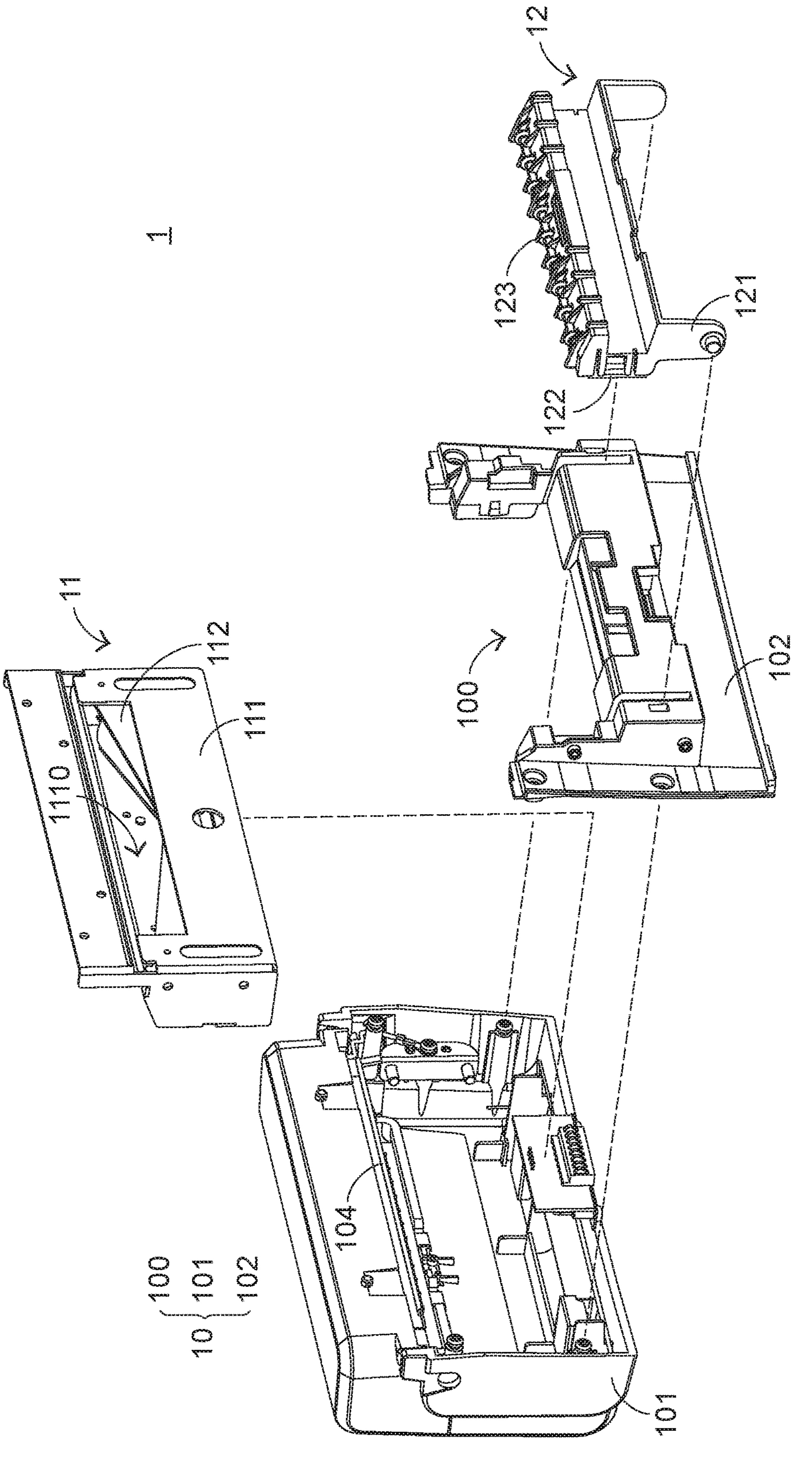
FIG. 3 is a schematic exploded view illustrating the structure of the cutting mechanism shown in FIG. 1.
Figure 4:
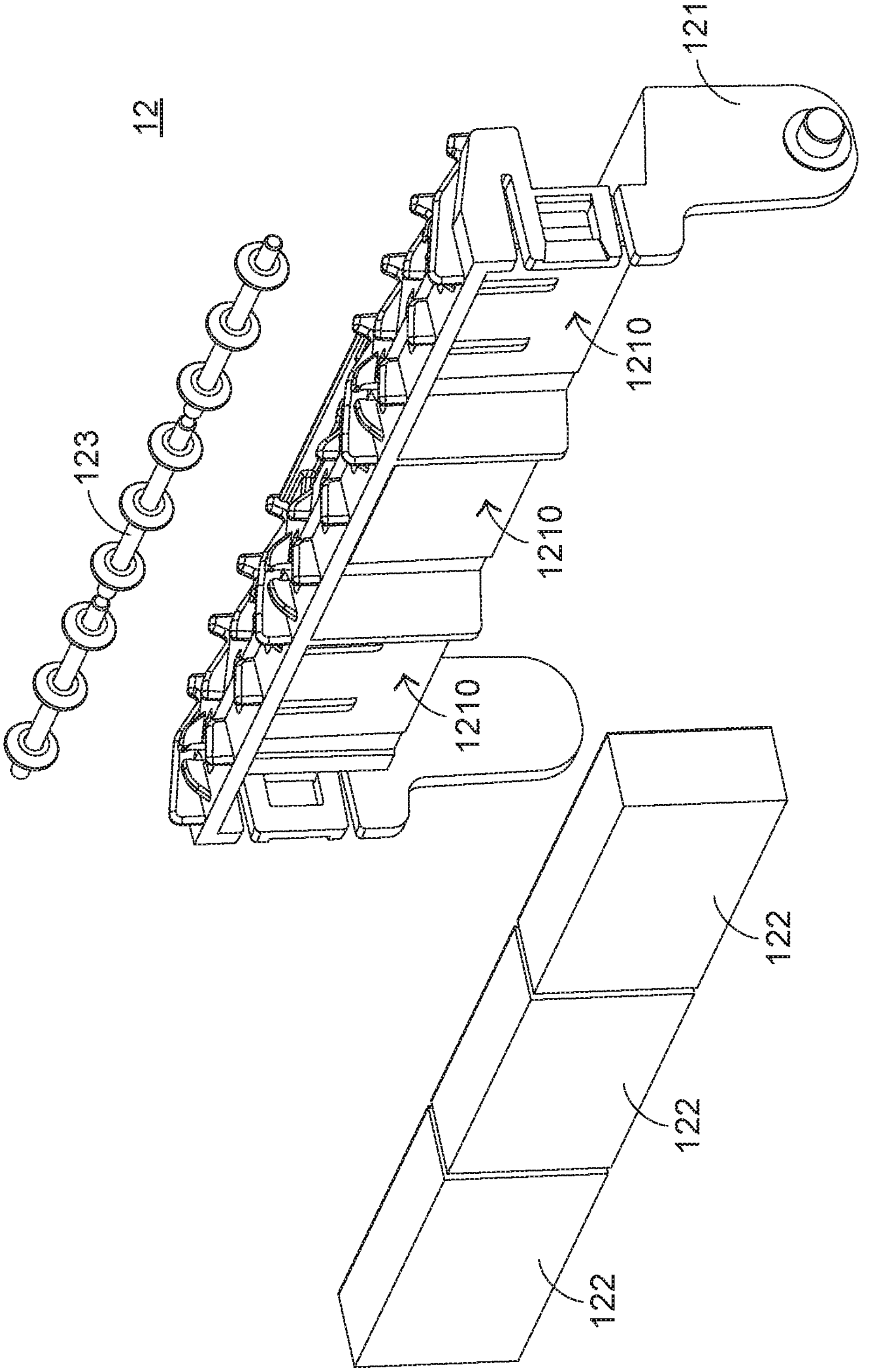
FIG. 4 is a schematic exploded view illustrating a lubricating assembly shown in FIG. 3.
Figure 5:
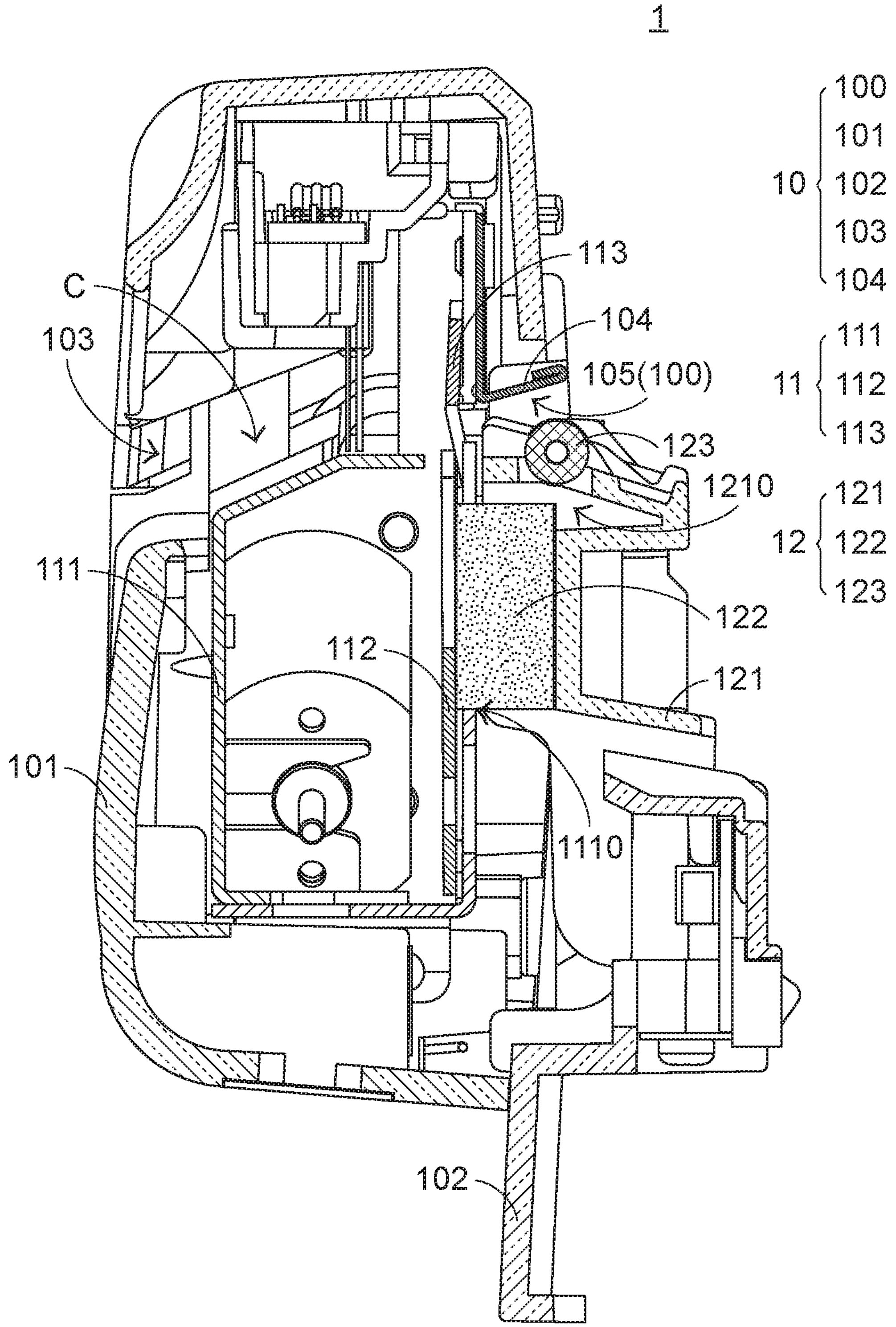
FIG. 5 is a schematic cross-sectional view illustrating the structure of the cutting mechanism shown in FIG. 1 and taken along the line AA.
Figure 6:
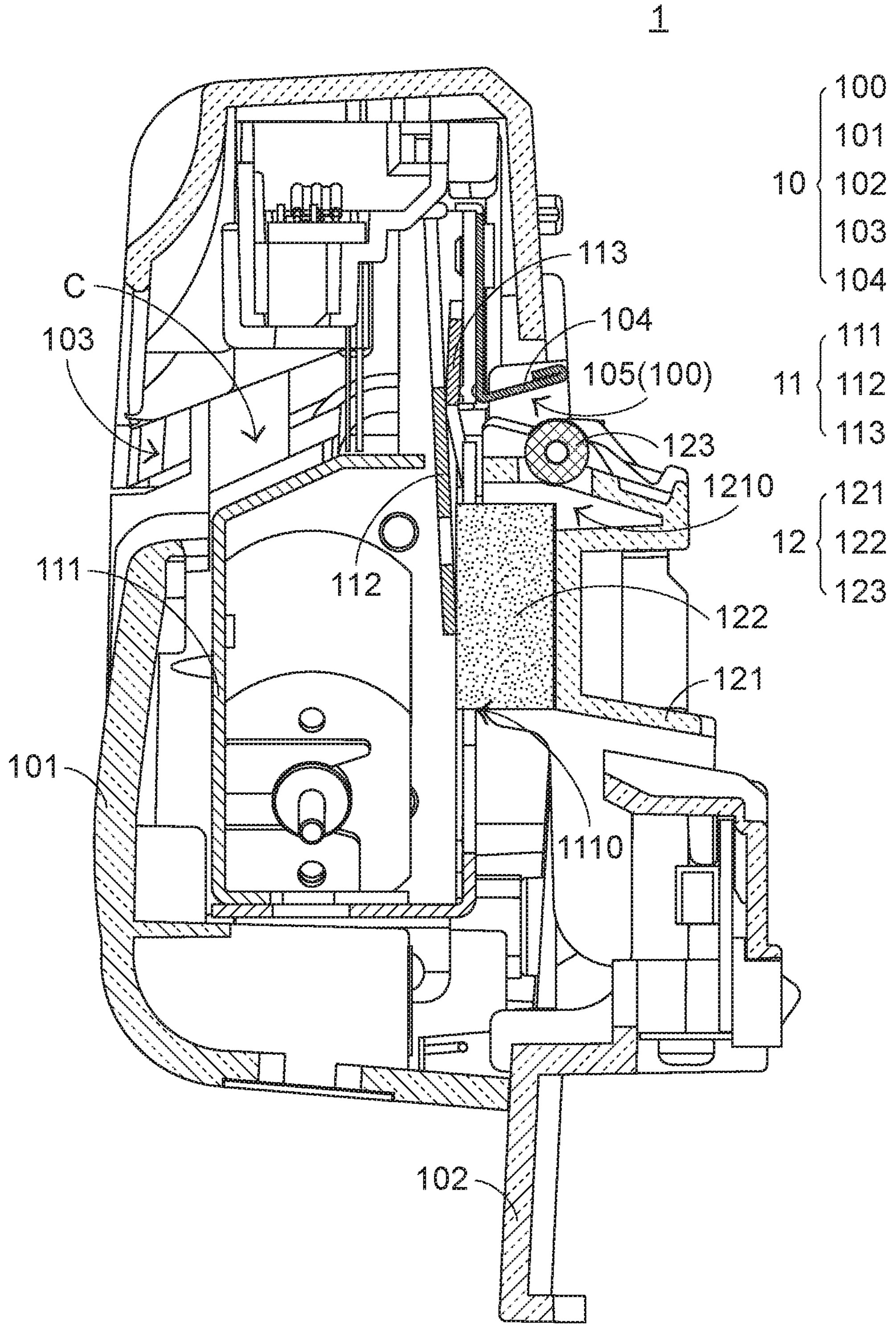
FIG. 6 is a schematic cross-sectional view illustrating the cutting mechanism shown in FIG. 5 after the movable knife of the knife assembly is moved upwardly.
Figure 7:
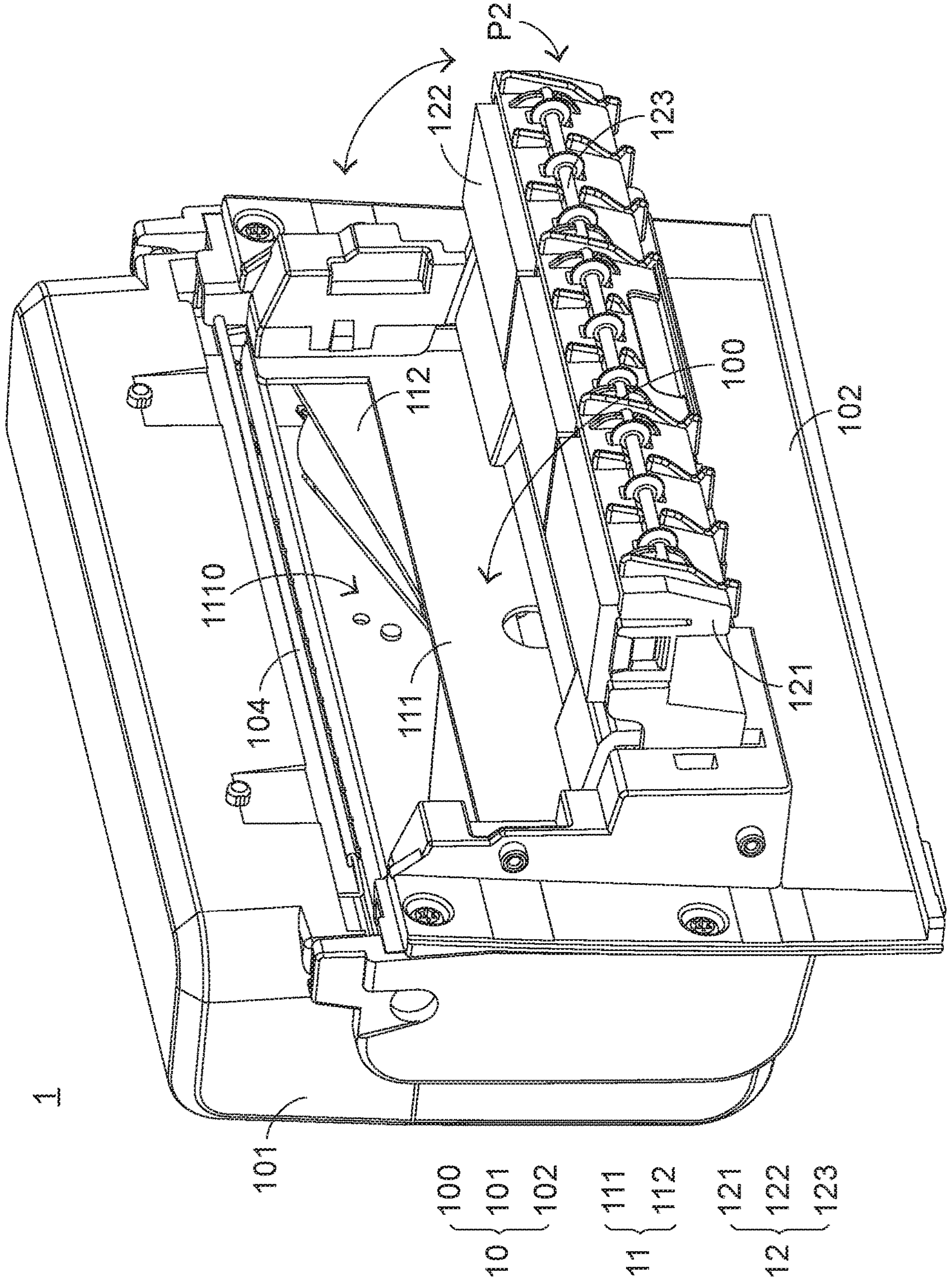
FIG. 7 is a schematic perspective view illustrating the cutting mechanism shown in FIG. 1 when the lubricating assembly is pivotally moved relative to the casing.

Please refer to FIGS. 1 to 7. FIG. 1 is a schematic perspective view illustrating the structure of a cutting mechanism according to an embodiment of the present invention and taken along a viewpoint. FIG. 2 is a schematic perspective view illustrating the structure of the cutting mechanism shown in FIG. 1 and taken along another viewpoint. FIG. 3 is a schematic exploded view illustrating the structure of the cutting mechanism shown in FIG. 1. FIG. 4 is a schematic exploded view illustrating a lubricating assembly shown in FIG. 3. FIG. 5 is a schematic cross-sectional view illustrating the structure of the cutting mechanism shown in FIG. 1 and taken along the line AA. FIG. 6 is a schematic cross-sectional view illustrating the cutting mechanism shown in FIG. 5 after the movable knife of the knife assembly is moved upwardly. FIG. 7 is a schematic perspective view illustrating the cutting mechanism shown in FIG. 1 when the lubricating assembly is pivotally moved relative to the casing.

The cutting mechanism 1 shown in FIGS. 1 to 7 is located beside a side of a printing device (not shown). It is noted that the relative positions between the cutting mechanism 1 and the printing device are not restricted. The cutting mechanism 1 is used to cut labels from the printing device. In an embodiment, the labels from the printing device are linerless labels. It is noted that the examples of the labels are not restricted. The structure of the printing device 1 for generating the linerless labels are well known to those skilled in the art, and not redundantly described herein. For brevity, only the structure of the cutting mechanism 1 will be described in more detail as follows.

Please refer to FIGS. 1 to 7. In an embodiment, the cutting mechanism 1 comprises a casing 10, a knife assembly 11 and a lubricating assembly 12. The casing 10 comprises an opening 100. The knife assembly 11 is disposed within the casing 10. The knife assembly 11 comprises a base 111 and a movable knife 112. The movable knife 112 is installed on the base 111. The movable knife 112 of the knife assembly 11 can be moved upwardly or downwardly relative to the base 111. While the movable knife 112 is moved upwardly or downwardly, the labels from the printing device can be cut by the movable knife 112. In addition, the movable knife 112 is exposed through the opening 100 of the casing 10. The lubricating assembly 12 comprises a support frame 121 and at least one oil-absorbing element 122. The at least one oil-absorbing element 122 is installed on the support frame 121. In addition, lubricating oil is absorbed in the at least one oil-absorbing element 122.

In an embodiment, the knife assembly 11 further comprises a hollow region 1110. The hollow region 1110 of the knife assembly 11 is formed in the base 111. In addition, the hollow region 1110 of the knife assembly 11 and the opening 100 of the casing 10 are aligned with each other. The movable knife 112 is also exposed through the hollow region 1110 of the knife assembly 11. The at least one oil-absorbing element 122 of the lubricating assembly 12 is inserted into the opening 100 of the casing 10 and the hollow region 1110 of the knife assembly 11 and directly contacted with the movable knife 112 of the knife assembly 11.

The lubricating assembly 12 is pivotally coupled to the casing 10 through the support frame 121. Consequently, the lubricating assembly 12 is pivotally moved relative to the casing 10. Since the lubricating assembly 12 is pivotally moved relative to the casing 10, the lubricating assembly 12 is selectively in an open state (e.g., in the situation of FIG. 7) or a close state (e.g., in the situation of FIG. 2). In case that the position of the lubricating assembly 12 relative to the casing 10 is in the close state, the opening 100 of the casing 10 is covered by the lubricating assembly 12. Under this circumstance, the at least one oil-absorbing element 122 of the lubricating assembly 12 is inserted into the opening 100 of the casing 10 and the hollow region 1110 of the knife assembly 11 and directly contacted with the movable knife 112 of the knife assembly 11. As the movable knife 112 is moved upwardly or downwardly relative to the base 111, the lubricating oil absorbed in the at least one oil-absorbing element 122 lubricates the movable knife 112. Consequently, the side surface and the blade edge (tip) of the movable knife 112 are both lubricated by the lubricating oil. In this way, the lubrication effect can be achieved.

The support frame 121 of the lubricating assembly 12 can be pivotally moved between a first position P1 and a second position P2 of the casing 10.

Please refer to FIGS. 2, 3, 4 and 5. When the support frame 121 is in the first position P1, the position of the lubricating assembly 12 relative to the casing 10 is in the close state. In the close state, the at least one oil-absorbing element 122 on the support frame 121 is inserted into the opening 100 of the casing 10 and the hollow region 1110 of the knife assembly 11 and directly contacted with the movable knife 112 of the knife assembly 11.

Please refer to FIG. 7. When the support frame 121 is pivotally moved from the first position P1 to the second position P2, the position of the lubricating assembly 12 relative to the casing 10 is in the open state. As the support frame 121 is pivotally moved, the at least one oil-absorbing element 122 is detached from the movable knife 112 of the knife assembly 11.

As mentioned above, the lubricating assembly 12 is pivotally moved relative to the casing 10. Consequently, the lubricating assembly 12 is switched between the open state and the close state. After the lubricating assembly 12 is pivotally moved relative to the casing 10 and switched to the open state, the user can replace the oil-absorbing element 122 on the support frame 121 or add lubricating oil to the oil-absorbing element 122 and clean the movable knife 112 of the knife assembly 11.

Especially, the lubricating assembly 12 is pivotally coupled to the casing 10 in a detachable manner. That is, the lubricating assembly 12 can be directly detached from the casing 10. After the lubricating assembly 12 is removed from the casing, the process of replacing the oil-absorbing element 122 or the process of adding the lubricating oil can be performed more easily. Furthermore, it is easier to clean the support frame 121 in detail or replace the support frame 121 with a new one.

As mentioned above, in the cutting mechanism 1 of the present invention, the oil-absorbing element 122 is fixed on the support frame 121, and the oil-absorbing element 122 is previously pressed and attached on the movable knife 112 of the knife assembly 11. When the movable knife 112 is continuously moved upwardly and downwardly in a reciprocating manner to cut labels, the movable knife 112 is continuously rubbed against the oil-absorbing element 122. Since the lubricating oil absorbed in the at least one oil-absorbing element 122 lubricates the movable knife 112 continuously, the purpose of lubricating the movable knife 112 can be achieved.

Moreover, the results of actual experiments and verifications on the cutting mechanism 1 indicate that the movable knife 112 of the knife assembly 11 is maintained in the lubricated state after cutting out 100,000 high-viscosity linerless labels and not lubricated by the label adhesive and the label debris. In other words, it is not necessary to frequently add the lubricating oil during the process of using the cutting mechanism 1. Consequently, the problems of oiling the cutter once and the manually oiling the cutter in the conventional technologies can be effectively avoided.

In an embodiment, the casing 10 comprises a front cover 101 and a rear cover 102, which are assembled with each other. After the front cover 101 and the rear cover 102 are assembled together, an accommodation space is defined. The opening 100 of the casing 10 is formed in the rear cover 102. The knife assembly 11 is disposed within the accommodation space of the casing 10. The lubricating assembly 12 is pivotally coupled to the rear cover 102 of the casing 10. That is, the lubricating assembly 12 is pivotally moved relative to the rear cover 102 of the casing 10, and thus the lubricating assembly 12 is selectively in the open state or the close state.

In an embodiment, the oil-absorbing element 122 of the lubricating assembly 12 is made of felt because felt has special material properties. For example, felt is structurally stable and not easily deformed, and has the elasticity. Due to the material properties, the oil-absorbing element 122 of the lubricating assembly 12 can be in close contact with the movable knife 112 of the knife assembly 11. In an embodiment, the lubricating oil is silicone oil because silicone oil has the characteristics of high and low temperature resistance, anti-oxidation, and low volatility. Due to these characteristics, the oil-absorbing element 122 can be maintained in an oil-containing state for a long time.

It is noted that the material of the oil-absorbing element 122 is not restricted to felt. In some other embodiments, the oil-absorbing element 122 is made of porous foaming material. Similarly, the lubricating oil is not restricted to silicone oil. In some other embodiments, the lubricating oil is a comparable oil with similar characteristics to silicone oil.

As shown in FIG. 4, the support frame 121 of the lubricating assembly 12 further comprises at least one receiving part 1210. The at least one receiving part 1210 is used for receiving the at least one oil-absorbing element 122. In an embodiment, the at least one oil-absorbing element 122 includes three oil-absorbing elements 122. Correspondingly, the number of the at least one receiving part 1210 of the support frame 121 is three. After these oil-absorbing elements 122 are received within the corresponding receiving parts 1210 of the support frame 121 and squeezed, the lubricating oil will not flow out from the surrounding directions. Consequently, the lubricating oil absorbed by the oil-absorbing elements 122 can effectively lubricate the movable knife 112 of the knife assembly 11.

In an embodiment, the weight of the lubricating oil absorbed by the oil-absorbing element 122 is in the range between 5 grams and 7 grams. In case that the lubricating oil absorbed by the oil-absorbing element 122 is in the range between 5 grams and 7 grams and the position of the lubricating assembly 12 relative to the casing 10 is in the close state, the oil-absorbing element 122 is in contact with the movable knife 112 of the knife assembly 11. Under this circumstance, the oil-absorbing element 122 is squeezed by the movable knife 112 of the knife assembly 11. However, the lubricating oil absorbed by the oil-absorbing elements 122 will not overflow out to contaminate the components other than the movable knife 112. Consequently, the lubricating oil in the oil-absorbing elements 122 can completely adhere to the movable knife 112 of the knife assembly 11 for lubrication.

Please refer to FIGS. 1, 2, 5 and 6. In an embodiment, the casing 10 further comprises an output port 103 and a guide plate 104. The output port 103 is formed in the front cover 101 of the casing 10. The output port 103 and the opening 100 in the rear cover 102 of the casing 10 are aligned with each other. The guide plate 104 is extended externally from the opening 100 of the rear cover 102 and located over the lubricating assembly 12. The region between the guide plate 104 and the lubricating assembly 12 is defined as an inlet port 105 corresponding to the output port 103. In an embodiment, the knife assembly 11 is disposed within the casing 10, and the space in the base 111 of the knife assembly 11 and between the output port 103 and the inlet port 105 is defined as a channel C. After the linerless label from the printing device (not shown) is introduced into the channel C through the inlet port 105, the linerless label in the channel C is cut into an appropriate size by the rising movable knife 112. Then, the cut linerless label is outputted through the output port 103.

Please refer to FIGS. 2, 3, 4, 5, 6 and 7. In an embodiment, the lubricating assembly 12 further comprises a roller assembly 123. The roller assembly 123 is installed on the support frame 121 and located over the at least one oil-absorbing element 122. In an embodiment, the roller assembly 123 of the lubricating assembly 12 and the guide plate 104 of the casing 10 are aligned with each other. In addition, the inlet port 105 is defined by the roller assembly 123 of the lubricating assembly 12 and the guide plate 104 of the casing 10 collaboratively. The linerless label from the printing device (not shown) can be guided by the roller assembly 123 of the lubricating assembly 12 and introduced into the channel C through the inlet port 105.

Please refer to FIGS. 5 and 6 again. In an embodiment, the knife assembly 11 further comprises a fixed knife 113. The fixed knife 113 of the knife assembly 11 is installed on the base 111 and arranged above the movable knife 112. That is, the fixed knife 113 and the movable knife 112 are respectively located at an upper position and a lower position of the knife assembly 11. After the linerless label from the printing device (not shown) is introduced into the channel C through the inlet port 105, the rising movable knife 112 and the fixed knife 113 are engaged with each other. Consequently, the linerless label in the channel C is cut into the appropriate size. Especially, while the rising movable knife 112 and the fixed knife 113 are engaged with each other, the lubricating oil adhering to the movable knife 112 also lubricates the fixed knife 113. Consequently, the fixed knife 113 is also effectively lubricated.

In an embodiment, the roller assembly 123 of the lubricating assembly 12 are covered by an anti-stick layer (not shown). That is, the surfaces of plural rollers of the roller assembly 123 are covered by the anti-stick layer. Consequently, while the linerless label is guided into the channel C through the inlet port 105 of the casing 10, the adhesive on the linerless label will not stick on associated components. That is, while the linerless label from the printing device is guided into the channel C through the inlet port 105 by the roller assembly 123, the anti-stick layer on the roller assembly 123 can effectively prevent the adhesive on the linerless label from sticking on the rollers. In an embodiment, the anti-stick layer is further sprayed on the support frame 121 of the lubricating assembly 12 in order to prevent the adhesive on the linerless label from sticking on the support frame 121 of the lubricating assembly 12. Preferably but not exclusively, the anti-stick layer is made of ultraviolet curable paint (such as UV paint).

From the above descriptions, the present invention provides the cutting mechanism. In the cutting mechanism, the oil-absorbing element containing the lubricating oil is installed on the support frame, which is detachable and pivotally movable. Furthermore, the oil-absorbing element is previously pressed and attached on the movable knife of the knife assembly. When the movable knife of the knife assembly is moved upwardly and downwardly in a reciprocating manner, the movable knife is continuously rubbed against the oil-absorbing element containing the lubricating oil. Since the lubricating oil in the oil-absorbing element lubricates the movable knife continuously, the purpose of continuously lubricating the movable knife can be achieved. In this way, the surface of the movable knife is maintained in the lubricated state and not lubricated by the label adhesive and the label debris. Since the movable knife is kept clean for a long time, the service life of the knife assembly will be extended. The cutting mechanism of the present invention is especially designed to deal with a lot of residual adhesives or foreign matters when the cutting linerless media. Since the surface of the movable knife is maintained in the lubricated state, the surface of the movable knife will not be stained by so many residual adhesives that are generated quickly.

The cutting mechanism of the present invention has the following advantages.

Firstly, it is not necessary to use a tank with a bulky space to store the lubricating oil in the cutting mechanism. Instead, by controlling the amount of the lubricating oil (e.g., in the range between 5 g and 7 g) and applying the lubricating oil on the felt, the lubricating oil can be directly contacted with the movable knife to achieve the lubrication purpose.

Secondly, the lubricating assembly can be detached from the casing. That is, when the support frame for fixing the oil-containing felt is pivotally moved relative to the casing and switched to the open state, the user can replace the felt and clean the movable knife.

Thirdly, in order to ensure that the linerless labels to be transferred without sticking to the path, the lubricating assembly is additionally equipped with the roller assembly. Consequently, the drag force generated by the adhesive of the linerless label in the moving path will be reduced.

Fourthly, in order to prevent the linerless labels from leaving adhesive residue on the path during transportation, the anti-stick layer is sprayed on the relevant components and the roller assembly. Consequently, the problem of sticking the adhesive on associated components will be avoided.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A cutting mechanism for cutting a label from a printing device, the cutting mechanism comprising:

a casing comprising an opening, an output port, and a guide plate, wherein the output port and the opening are aligned with each other, the guide plate is extended externally from the opening and located over the lubricating assembly, a region between the guide plate and the lubricating assembly is defined as an inlet port corresponding to the output port, and a space in the base of the knife assembly and between the inlet port and the output port is defined as a channel;

a knife assembly disposed within the casing, and comprising a base and a movable knife, wherein the movable knife is installed on the base, the movable knife is movable upwardly or downwardly relative to the base to cut the label, and the movable knife is exposed through the opening; and a lubricating assembly comprising a support frame, at least one oil-absorbing element, and a roller assembly, wherein the at least one oil-absorbing element is installed on the support frame, and a lubricating oil is absorbed in the at least one oil-absorbing element, wherein the lubricating assembly is pivotally coupled to the casing through the support frame, so that the at least one oil-absorbing element is inserted into the opening and contacted with the movable knife of the knife assembly, wherein while the movable knife is moved upwardly or downwardly, the lubricating oil in the at least one oil-absorbing element lubricates the movable knife, the roller assembly is installed on the support frame and located over the at least one oil-absorbing element, the roller assembly and the guide plate of the casing are aligned with each other, and the inlet port is defined by the roller assembly and the guide plate of the casing collaboratively.

2. The cutting mechanism according to claim 1, wherein the support frame of the lubricating assembly is pivotally moved in a region between a first position and a second position of the casing, wherein when the support frame is in the first position, the at least one oil-absorbing element is inserted into the opening and contacted with the movable knife, wherein when the support frame is pivotally moved from the first position to the second position, the at least one oil-absorbing element is correspondingly moved with the support frame and detached from the movable knife.

3. The cutting mechanism according to claim 1, wherein the lubricating assembly is pivotally coupled to the casing in a detachable manner.

4. The cutting mechanism according to claim 1, wherein the support frame of the lubricating assembly comprises at least one receiving part, and the at least one oil-absorbing element are received within the at least one receiving part.

5. The cutting mechanism according to claim 1, wherein the at least one oil-absorbing element is made of felt or porous foaming material.

6. The cutting mechanism according to claim 1, wherein the lubricating oil absorbed by the oil-absorbing element is between 5 grams and 7 grams.

7. The cutting mechanism according to claim 1, wherein the cutting mechanism further comprises an anti-stick layer, and a surface of the support frame of the lubricating assembly is covered by the anti-stick layer.

8. The cutting mechanism according to claim 1, wherein the cutting mechanism further comprises an anti-stick layer, and the roller assembly comprises plural rollers, wherein surfaces of the plural rollers are covered by the anti-stick layer.

9. The cutting mechanism according to claim 1, wherein the knife assembly further comprises a fixed knife, and the fixed knife is installed on the base and arranged above the movable knife, wherein while the movable knife is moved upwardly, the movable knife and the fixed knife are engaged with each other to cut the label.

10. The cutting mechanism according to claim 1, wherein the knife assembly further comprises a hollow region, wherein the hollow region is formed in the base and aligned with the opening of the casing, the movable knife is exposed through the hollow region, and the at least one oil-absorbing element of the lubricating assembly is inserted into the opening and the hollow region and contacted with the movable knife.

11. The cutting mechanism according to claim 1, wherein the label is a linerless label.

* * * * *